United States Patent [19]

Kabayama

[11] Patent Number: 5,012,911
[45] Date of Patent: May 7, 1991

[54] PULL TYPE CLUTCH

[75] Inventor: Yoshiaki Kabayama, Neyagawa, Japan

[73] Assignee: Kabushiki Kaisha Daikin Seisakusho, Osaka, Japan

[21] Appl. No.: 381,712

[22] PCT Filed: Nov. 10, 1988

[86] PCT No.: PCT/JP88/01132
§ 371 Date: Jul. 3, 1989
§ 102(e) Date: Jul. 3, 1989

[87] PCT Pub. No.: WO89/04926
PCT Pub. Date: Jun. 1, 1989

[30] Foreign Application Priority Data

Nov. 24, 1987 [JP] Japan ............... 62-179401[U]

[51] Int. Cl.⁵ .................................. F16D 13/44
[52] U.S. Cl. ................... 192/89 B; 192/99 S; 192/98
[58] Field of Search ............ 192/99 S, 99 R, 89 B, 192/98

[56] References Cited

U.S. PATENT DOCUMENTS 4,655,335 4/1987 Maruyamano et al. ........... 192/99 S
4,860,870 8/1989 Romig ............................. 192/99 S

FOREIGN PATENT DOCUMENTS 53-16548 12/1978 Japan.
60-157519 8/1985 Japan.

Primary Examiner—Rodney H. Bonck
Assistant Examiner—Andrea Pitts
Attorney, Agent, or Firm—Armstrong, Nikaido, Marmelstein, Kubovcik & Murray

[57] ABSTRACT

A pull type clutch having a clutch disc (16) and a pressure plate (18) in a clutch cover (20) mounted on a flywheel (10), an approximately annular diaphragm spring (22) so installed as to connect its outer peripheral part to said clutch cover (20) and to connect its inner peripheral part to a release bearing (24) which is slidden in an axial direction by a lever-like release fork (26) supported by a pivot (36) fixed to a transmission housing (34), and a fulcrum hole (42) of said release fork (26) for penetrating said pivot (36), characterized by said fulcrum hole (42) extends toward a center (0) of said release bearing (24) so that said release fork (26) can be moved outwardly in a radial direction of a clutch in order to remove a transmission (12).

2 Claims, 3 Drawing Sheets

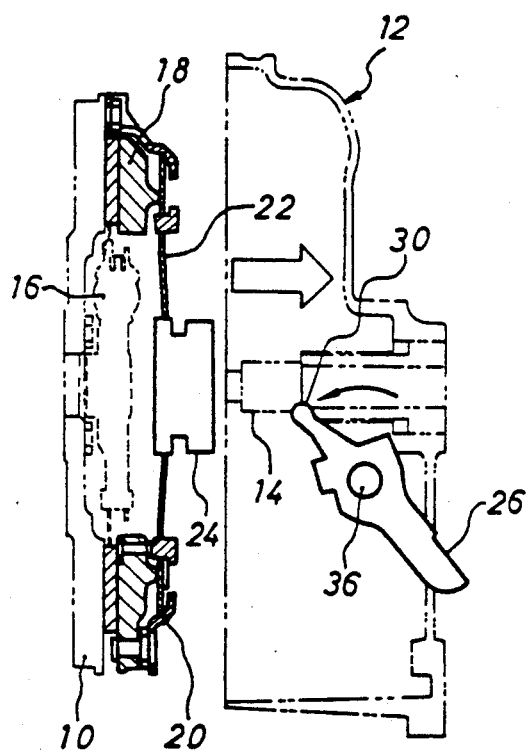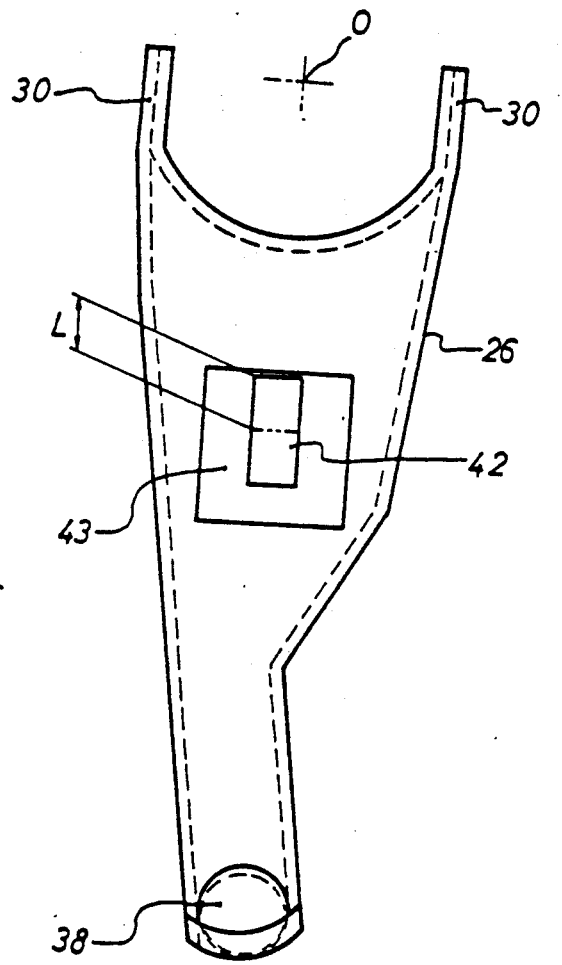

PULL TYPE CLUTCH

TECHNICAL FIELD

This invention relates to a pull type clutch having a lever-like release fork.

BACKGROUND ART

In a conventional pull type clutch of this type, a release bearing is caused to slide in an axial direction by a lever-like release fork supported to a transmission housing.

It is therefore necessary to disengage the release fork from the release bearing in order to remove the transmission. However, because disengaging the release fork from the release bearing is difficult in the conventional type, the removal work of the transmission becomes hard task.

DISCLOSURE OF THE INVENTION

An object of this invention is to provide a pull type clutch which enable operator to carry out the removal work of transmission very easily.

STRUCTURE OF THE INVENTION (1) Technical measure

This invention relates to a pull type clutch having a clutch disc and a pressure plate in a clutch cover mounted on a flywheel, an approximately annular diaphragm spring so installed as to connect its outer peripheral part to said clutch cover and to connect its inner peripheral part to a release bearing which is caused to slide in an axial direction by a lever-like release fork supported by a pivot fixed to a transmission housing, and a fulcrum hole of said release fork for penetrating the pivot, characterized by the fulcrum hole extends toward a center of the release bearing so that the release fork can be moved outwardly in a radial direction of a clutch in order to remove a transmission.

(2) Function

The release fork is moved to the radially outer direction in order to disengage it from the release bearing.

BRIEF DESCRIPTION OF DRAWINGS

FIG. 3 is a plan view of a release fork; and

FIG. 4 is a schematic view showing a removal work of a transmission.

BEST MODE FOR CARRYING OUT THE INVENTION

Figure 1:
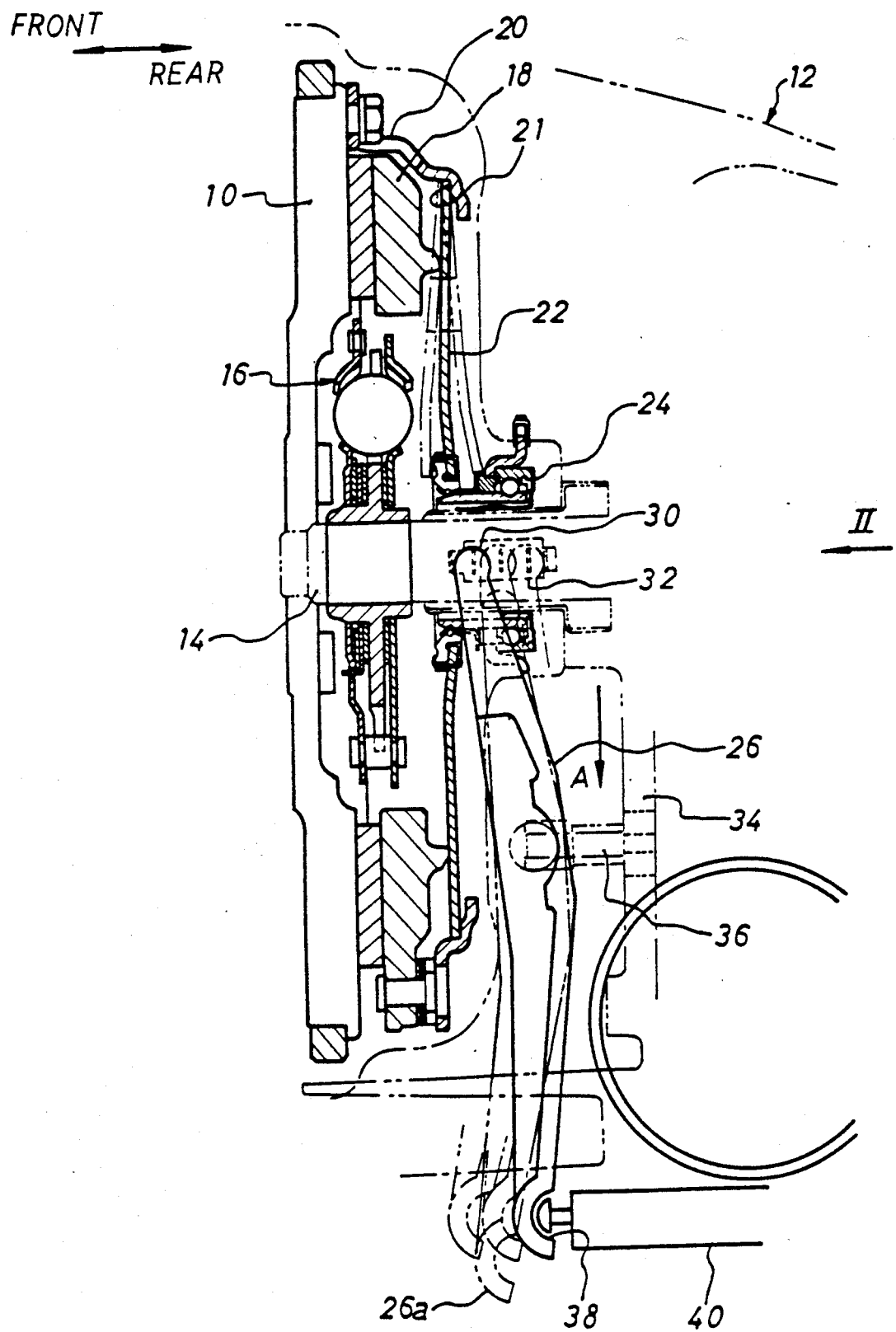
FIG. 1 is a vertical sectional view of a pull type clutch according to this invention.

In FIG. 1 which shows a vertical sectional view of a pull type clutch according to this invention, 10 is a flywheel. A main drive shaft 14 of a transmission 12 is supported at a central part of the flywheel 10, and a clutch disc 16 spline fits onto the drive shaft 14. A pressure plate 18 is installed at rear side of the clutch disc 16 so that is presses the clutch disc 16 onto the flywheel 10.

The clutch disc 16 and pressure plate 18 are coverd by a clutch cover 20 which is mounted on the flywheel 10. A diaphragm spring is disposed at the rear side of pressure plate 18, of which an outer peripheral part connects to a step portion 21 of the clutch cover 20, and an inner peripheral part connects to a release bearing 24. The release bearing 24, which is formed into an approximately cylindrical shape and is fitted onto an outer periphery of the main drive shaft 14, is caused to slide in an axial direction by a release fork 26 having a construction which is an essential feature of this invention. Thus, the clutch is disengaged (released operation) when the release bearing 24 is pulled to the rear or transmission side.

The release fork 26 is provided at inner end with a branched fork portion 30 (FIG. 2), which fits onto a projection 32 of the release bearing 24. A vertical intermediate portion of the release fork 26 is supported by a fulcrum 44 fixed to a housing 34 of the transmission 12 by fulcrum post 36, so that the release fork 26 can be pivoted around fulcrum 44. The release fork 26 is also provided at an outer peripheral part with a concaved part 38 which is pushed by a cylinder 40 so as to swing the fork portion 30 to the rear side.

Figure 2:
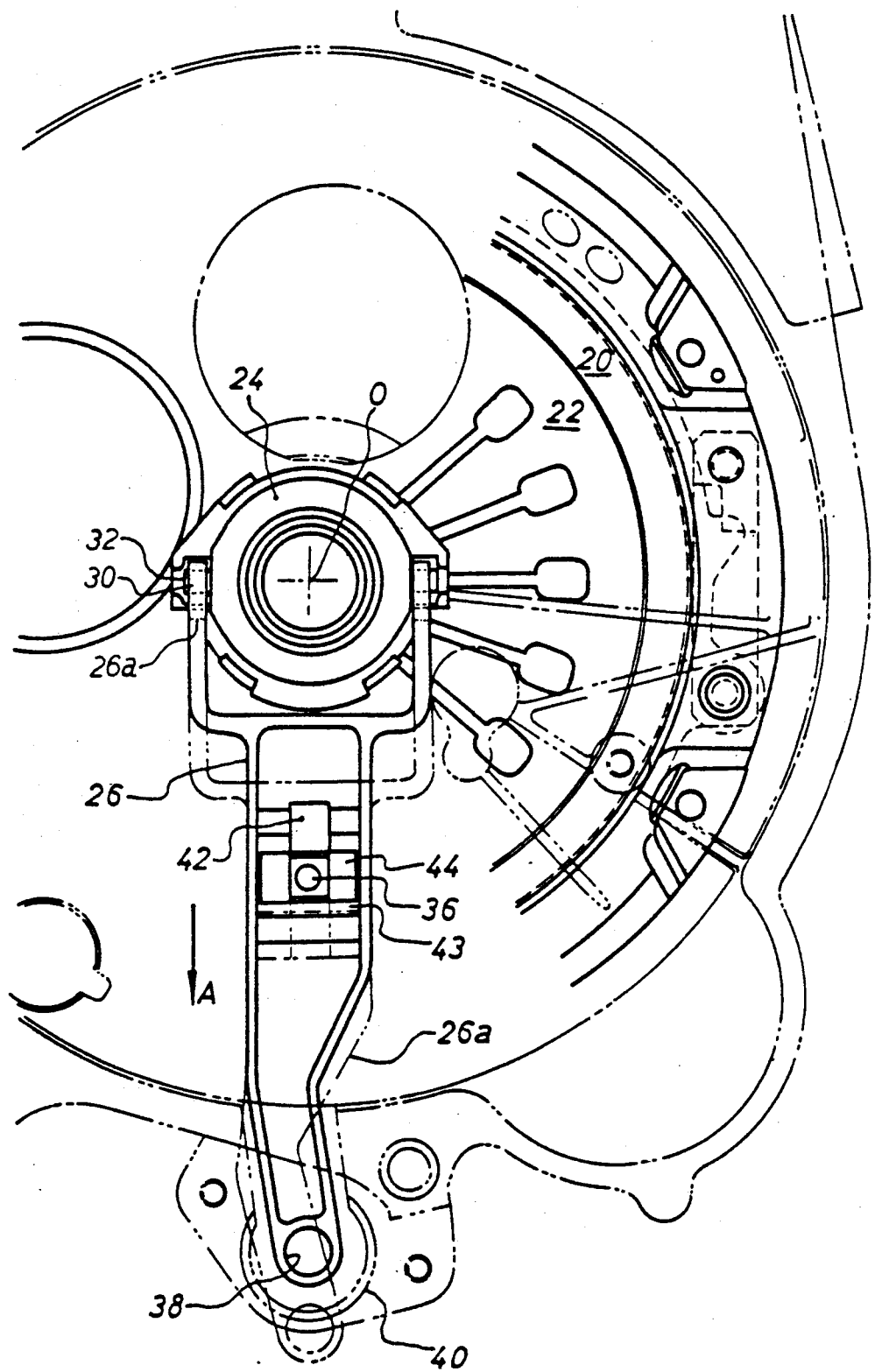
FIG. 2 is a view viewed in a direction of arrow II of FIG. 1.

As illustrated in FIGS. 1 and 2, the release fork 26 is also provided at intermediate portion with a fulcrum slot 42 through which the post 36 of fulcrum 44 passes to support the release fork 26. Fulcrum 44 is seated during normal use, in recessed portion 43 of the release fork 26. As illustrated in FIG. 3, the fulcrum slot 42 extends beyond normal use by a length L toward a center O of the release bearing 24 (FIG. 1), so the release fork 26 can be moved radially within the range of the length L.

Function will be described hereunder. Because fulcrum slot 42 of the release fork 26 extends by the length L toward the center O in this embodiment, to remove transmission 12, the release fork 26 can slide in a direction of arrow A of FIG. 1 to a position indicated by a two-dot chain line 26a to disengage the fork portion 30 from the projection 32 of the release bearing 24 by moving the release fork 26 radially from the release bearing 24. After release fork 26 is disengaged from the release bearing 24, the transmisison 12 is removed to the rear side as shown in FIG. 4.

EFFECT OF THE INVENTION

As described above, in the pull type clutch according to the present invention, because the fulcrum hole 42 of the release for 26 extends by the length L toward the center O as illustrated in FIG. 3, to remove transmission 12, the release fork 26 can be slide in the direction of arrow A (FIG. 1) so as to disengage the release fork 26 from the release bearing 24. Consequently, the removal work of the transmission 12 can be carried out without further disassembling the clutch.

I claim:

1. A pull type clutch having a clutch disc and a pressure plate in a clutch cover mounted on a flywheel between said flywheel and a transmission, an approximately annular diaphragm spring connected at its outer peripheral part to said clutch cover and connected at its inner peripheral part to a circular release bearing slidable in an axial direction by a lever-like release fork supported by a fulcrum fixed to a transmission housing by a fulcrum post, and a fulcrum slot in a recessed portion on said release fork through which said fulcrum post passes for supporting said release fork on said fulcrum in said recessed portion during normal use of said clutch, said fulcrum slot extending longitudinally in said release fork and toward the center of said circular release bearing so that said release fork can be moved radially outwardly from said release bearing for removing said transmission, with said release fork attached to said transmission, from said clutch.

2. A pull type clutch as set forth in claim 1, wherein said release fork is provided at its inner end with a branched fork portion which fits onto a projection provided at an outer periphery of said release bearing.

* * * * *